Dec. 30, 1958   R. E. McILRATH   2,866,885
AUTOMATIC ELECTRIC HEATER

Filed March 13, 1958   2 Sheets-Sheet 1

INVENTOR.
Roy E. McIlrath
BY Parker & Carter
Attorneys

Dec. 30, 1958  R. E. McILRATH  2,866,885
AUTOMATIC ELECTRIC HEATER
Filed March 13, 1958  2 Sheets-Sheet 2
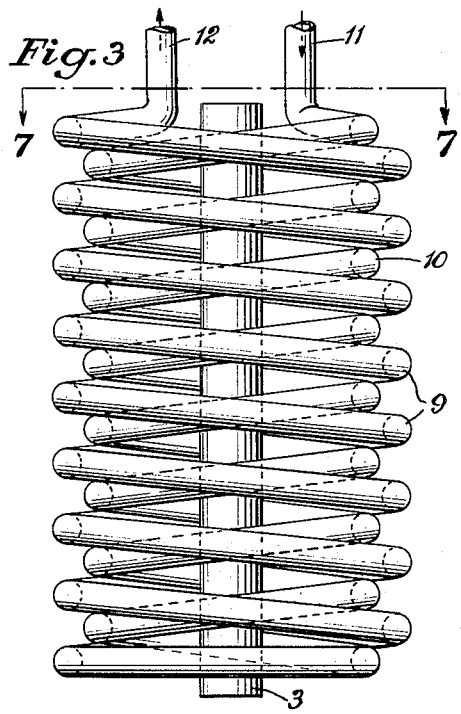
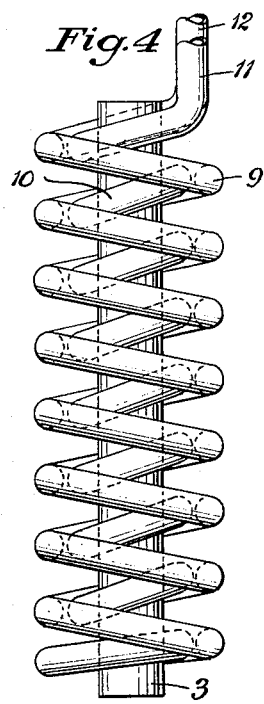
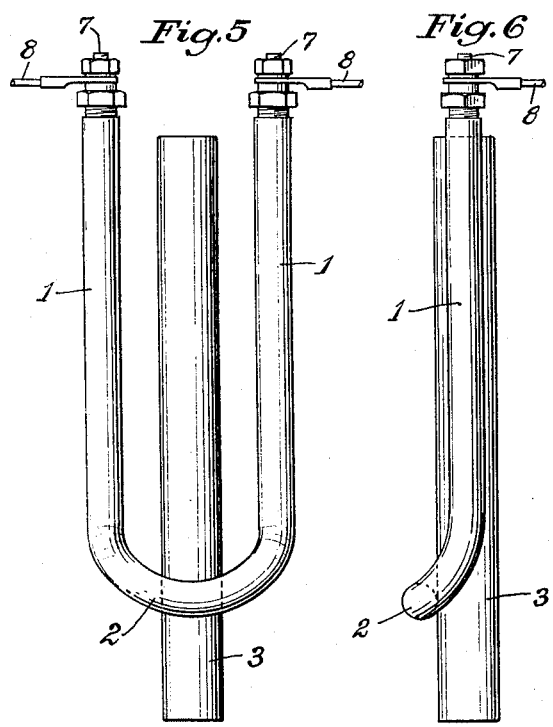
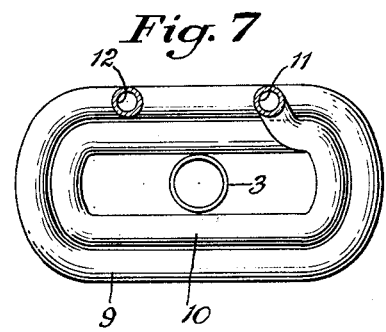
INVENTOR.
*Roy E. McIlrath*
BY
*Parker & Carter*
*Attorneys*

United States Patent Office 2,866,885
Patented Dec. 30, 1958

2,866,885

AUTOMATIC ELECTRIC HEATER

Roy E. McIlrath, Chicago, Ill.

Application March 13, 1958, Serial No. 721,157

6 Claims. (Cl. 219—39)

This invention relates to a heater or heating unit. It has for one object to provide a heater for use in connection with a moving fluid stream, gas or liquid.

Another object is to combine efficiently in a single member a plurality of parts including a heating unit, a fluid-circulating unit and control devices for the heater.

A further object is to provide in the device of the type indicated a convenient, inexpensive and effective grouping of the parts of the heater and the control elements to accomplish effective control and thereby to accomplish accurate temperature controls at all times and under all conditions.

Other purposes will appear from time to time during the course of the specification and claims.

I illustrate my invention more or less diagrammatically in the accompanying drawings wherein:

Fig. 3 is a view in elevation of the fluid-circulating coil and the shell which defines the location of the control members;

Fig. 4 is an elevation of the structure of Fig. 3 looking at right angles to Fig. 3;

Fig. 5 is an elevation showing the heating unit and the control shell member;

Fig. 6 is an elevation showing the assembly of Fig. 5 taken at an angle of 90 degrees; and Fig. 7 is a horizontal section taken at line 7—7 of Fig. 3.

Like parts are indicated by like numerals throughout the specification and drawings.

Figure 1:
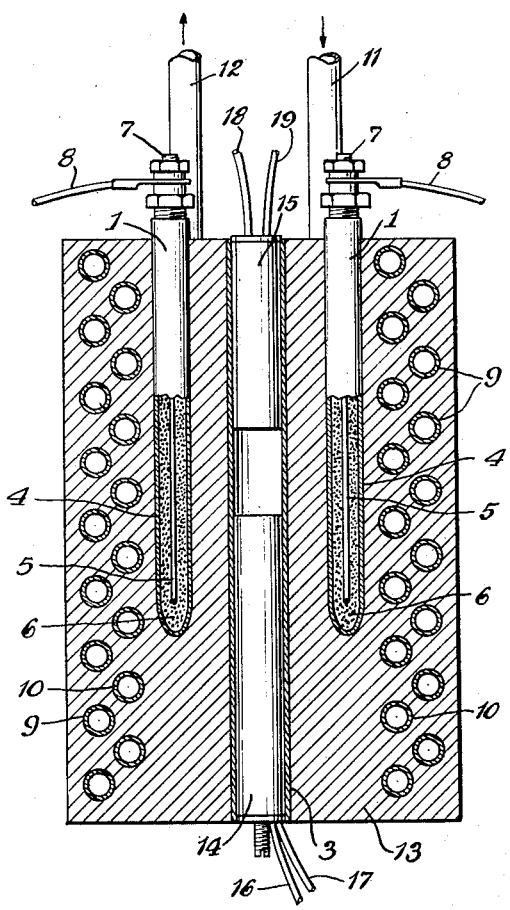
Fig. 1 is a vertical section through a heating unit with controls in place.

As shown the device includes a heating element 1. This element is a generally U-shaped member with a laterally bent portion 2. It is formed with two side portions which, as shown particularly in Figs. 1 and 5, are generally parallel. The laterally bent, curved portion 2 is arranged to economize space in the final assembly and thus to fit with or nest with the tube or shell 3. The tube or shell 3 provides a cavity within which control elements are positioned.

The heating element includes a shell 4 through which an electric conductor or wire 5 extends. The shell may be of steel; the wire 5 of any suitable electric conductor but preferably one designed to act as a heating unit. The space within the shell 4 is filled with silica sand 6, or other equivalent material. This sand separates the shell 4 and the wire 5 and tends to support the latter in proper spaced relationship. As shown, the wire 5 is supported centrally within the shell 4 throughout the length of the shell. At each end the wire terminates in a binding port or connecting member 7 to which a conductor 8 is connected. By means of this conductor, when connected to a source of electric energy is supplied to the heating unit and particularly, of course, to the wire or heating element 5.

A double coil is positioned about the shell 3 and about the heating element 1, 2. This double coil, as shown particularly in Figs. 1, 3 and 4, includes an outer coiled portion 9 and an inner continuous and integral portion 10. The inner coil terminates in an end 11 which may be considered the inner end and the outer coil terminates in an end 12. Fluid generally when circulated through the tube or coil enters through the end 11, passes downward along the inner coil 10, passes thence to the outer coil 9 and outwardly through the end 12. The coil is connected to a source of fluid so that the fluid which is to be treated by heating enters the coil, passes through it in close proximity to the heating element 1, 2 and thence leaves the system and moves to a point of use, storage, or other destination.

When the device is to be completed, the heating element 1, 2, the shell 3, and the coil 9, 10 are all cast into a block of metal 13, as shown in Fig. 1. This may, for example, be aluminum. The coil 9, 10, while it may be of different materials, is conveniently made of copper. As shown in Fig. 1, when the device is cast a unit is produced which includes the aluminum block 13, the fluid-circulating coil 9, 10, and the heating element 1, 2.

The control elements are conveniently inserted in the space defined by the shell 3. As shown, they include a thermostat 14 and a fuse 15. The thermostat is provided with wires or other conductors 16, 17 and the fuse is similarly provided with wires or other conductors 18, 19.

Figure 2:
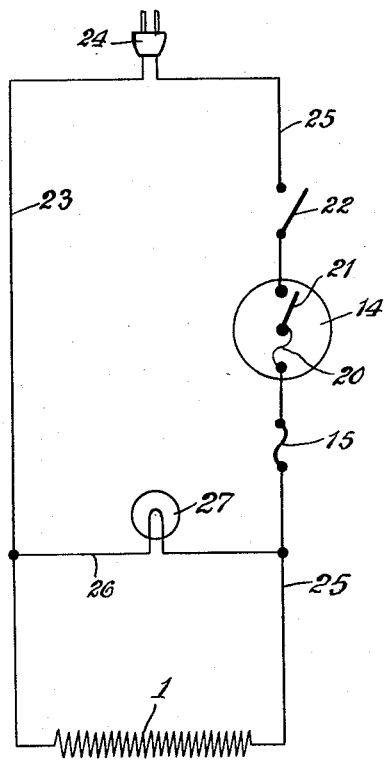
Fig. 2 is a schematic diagram of an electrical circuit suitable for the heater of this invention.

The structure above described is illustrated diagrammatically in Fig. 2 in which the heater 1 is shown as a coil. The thermostat, which includes a switch and is sometimes referred to as a thermoswitch, is indicated at 14. It includes the thermostat element 20 and the switch element 21. The fuse 15 is shown diagrammatically also in Fig. 2. A main manual control switch 22 is shown and by means of this switch the heater may be manually put into operation or turned off. A wire or conductor 23 is connected to the plug 24 and to the heater 1. Another wire or conductor 25 is connected to the plug 24 and the switch 22, the thermoswitch 14, and the fuse 15. A wire or conductor 26 extends across between the members 23 and 25 and carries a pilot light 27. When the system is in operation the light is illuminated.

Generally the device is enclosed in a housing, not shown, and the switch and pilot light are visible and available externally of the housing. The switch may be mounted on the housing and the pilot light may be mounted on it or arranged to show through an appropriate opening in the housing.

In general the essential features of the device have been shown. It is not limited to any particular mounting means or association. Actually in ordinary use it will be enclosed in some sort of a housing and the control switch will be located upon the housing or available for operation through the housing. The pilot lamp will also be visible through the housing. Thus the device, enclosed in a suitable housing and mounted conveniently, is available for use by the operation of the control switch and the pilot light indicates whether it is in use or not.

No housing or enclosure is shown because the invention is not limited to the use of the housing and if a housing is used, the invention is not limited to the details of a particular housing. It might even be used without a housing.

One use for the device is as a means for heating carbon dioxide. This material is generally received at points of use in a container in which it is in substantially liquid or solid form and it is vaporized for use, for example in bottling. The device, therefore, in one use comprises a heater for vaporizing liquid carbon dioxide. Generally the device is used as a heater to heat high pressure carbon dioxide gas to keep the gas at proper temperature to prevent the valve or valves in the system from "freezing." Generally when the material to be heated reaches the heater of this invention it is already in gaseous form. When that is the case the primary purpose of the device is to act not as a vaporizer for vaporizing the liquid carbon dioxide or other material, but to act as a heater to maintain the gas at proper heat for proper use and for passage through the system without "freezing." When so used it will generally be located near a source of carbon dioxide, such as a tank, a flask or a battery of flasks, bottles or tanks and it heats the gas as it flows. The invention is not limited in its use to vaporizing carbon dioxide and that use is mentioned only as indicative of the fact that the heater is suitable for use as a vaporizer of liquid gases, of which carbon dioxide is representative.

Although an operative form of the device has been shown, the invention is not limited to the particular details shown. Many changes may be made in the form, shape and arrangement of parts without departing from the spirit of the invention.

The use and operation of the invention are as follows:

Where the device is used as a heater for carbon dioxide and is located near a source of liquid carbon dioxide, the material is connected to the inlet and outlet pipes or connections which join the coil. Carbon dioxide will flow through the coil which, in the finished device, is enclosed in the block within which it is cast. It is heated in the block to insure proper vaporization and proper temperature of the gas. The heater, as shown, is an electrical member which is cast into the block and thus the heater and the fluid coil form, with the block, a unit, the parts of which are unseparable after casting has taken place. If now the fluid connections are open so that carbon dioxide may flow through the coil, and if at the same time the heater circuit is closed so that the heater is energized and heated, the device will accomplish vaporization.

It is preferable, and in many cases essential, to provide automatic controls for insuring as nearly as possible perfect vaporization and proper heating of the gas and uniform treatment so that the device as a whole operates efficiently and, as nearly as possible, continuously at the desired heat and under the desired conditions. Manual control alone will not normally accomplish satisfactory operation. The mere addition of a thermostat or a thermostatically-controlled switch or rheostat is not of itself a full solution of the problem of accomplishing uniformity of operation. A thermostatic device will limit fluctuation, but unless properly located and properly arranged in the system, it will not avoid fluctuation to the degree most desired.

It is to accomplish effective control with a minimum of fluctuation that the thermostat or thermoswitch has been located as shown. The thermostatic switch is positioned within the block and it is, in effect, partially surrounded by the heater.

The center tube, which is present when the block is cast, produces a central cylindrical cavity into which the thermostatic switch is positioned as shown in the assembled figure. The thermostat or thermostatic switch is thus positioned completely within the block, which is heated, and it is within this block that the heater and the fluid-circulating coil are also located. Thus the thermostatic switch and the thermostat portion, in particular, are located in an environment in which the thermostat is subject, as closely as possible, to precisely the heating condition and temperature to which the fluid coil is also subject. With this location of the thermostatic switch the control of the temperature of the vaporizing coil is rendered accurate and the heating assembly will operate with a minimum of fluctuation. Therefore a more nearly uniform and much less interrupted operation takes place than is possible under other conditions. The size of the opening defined by the center tube in the block is as small as possible, consonant with the required size of the thermostatic switch. Thus air gaps and other factors which might interfere in the accurate thermostatic control are eliminated or reduced to a minimum.

To protect the system against overheating or damage due to excess temperature a fuse is also provided. This is a thermofuse and is primarily, if not entirely, temperature-responsive. Therefore excessive heating actuates the fuse to cut off operation of the heater. The excessive heating may be due, of course, to any cause, both to electrical irregularity or to excessive thermal conditions in the block itself.

By locating the fuse centrally and within and surrounded by the block, it is, as nearly as possible, subject at all times to the same temperature conditions as those prevailing generally within the block. Thus a fuse is located at a point where it will inevitably respond accurately and promptly to conditions which prevail in the block as a whole. This location of the fuse, which, incidentally, brings it in close proximity to the thermostat, insures safe operation and accurate operation of the fuse when conditions develop within the block which cause fuse actuation. By locating the fuse and the thermostat or thermostatic switch within the block and in close proximity with each other, the effective and accurate operation of the heater is insured.

With the parts as shown and with the heating device connected to a source of electricity and with the circulating coil connected to a source of carbon dioxide, the device is ready for use. The control switch is operated to close the circuit and the heating element is energized and heated. The control valves or other control means in the fluid line are operated to cause carbon dioxide to flow through the coil. The carbon dioxide is heated as it does so and proper temperature is maintained.

The thermostat of the thermostatic switch will be set, normally, at a desirable temperature to accomplish the heating required and a minimum of fluctuation will occur because of the location of the thermostat in close proximity both to the heating element which is, in effect, "wrapped" around it, and in close proximity to the fluid coil through which the carbon dioxide moves.

The fuse may be adjustable and may be set for proper action in response to predetermined conditions. Generally, however, it will not be an adjustable fuse but will be a fuse specifically chosen for the operation in question and specifically chosen to respond to a predetermined degree of overheating or other unsatisfactory conditions. In either case, however, the fuse operates to protect the device against overheating in particular, and unsatisfactory operation generally.

Carbon dioxide has been spoken of as a material which is heated by the present invention. Many other gases or liquids can be treated by the heater of the present invention and this invention is, therefore, not limited in its usefulness or application to any particular material.

I claim:

1. In combination in a heater, a structure comprising a mass of metal, said mass of metal being shaped to define a cavity, a metallic fluid passage member positioned outside of the cavity and cast within the mass of material, said member being provided with entrant and exit ends extending beyond the mass, an electric heater element cast within the mass, positioned between said fluid passage and the cavity and extending at one portion about the cavity in close proximity to it, a thermostat switch comprising a thermostatic element and a switch element adapted to be controlled by said thermostat, said thermostat switch being positioned within the cavity, electric circuit-defining means joining said thermostat switch and said heater in circuit, and a control switch in said circuit.

2. In combination in a heater, a structure comprising a mass of metal, said mass of metal being shaped to define centrally a cavity, a metallic fluid passage member positioned outside of the cavity and cast within the mass of material, said member being provided with entrant and exit ends extending beyond the mass, an electric heater element cast within the mass, positioned between said fluid passage and the cavity, a thermostat switch comprising a thermostatic element and a switch element adapted to be controlled by said thermostat, said thermostat switch being positioned within the cavity, electric circuit-defining means joining said thermostat switch and said heater in circut, and a control switch in said circuit.

3. In combination in a heater, a structure comprising a mass of metal, said mass of metal being shaped to define centrally an axially aligned cavity, a metallic fluid passage member positioned outside of the cavity and cast within the mass of material, said member being provided with entrant and exit ends extending beyond the mass, an electric heater element cast within the mass, positioned between said fluid passage and the cavity, a thermostat switch comprising a thermostatic element and a switch element adapted to be controlled by said thermostat, said thermostat switch being positioned within the cavity, electric circuit-defining means joining said thermostat switch and said heater in circuit, and a control switch in said circuit.

4. In combination in a heater, a structure comprising a mass of metal, said mass of metal being shaped to define centrally an axially aligned cylindrical cavity, a metallic fluid passage member positioned outside of the cavity and cast within the mass of material, said member being provided with entrant and exit ends extending beyond the mass, an electric heater element cast within the mass, positioned between said fluid passage and the cavity and extending at one portion about the cavity in close proximity to it, a thermostat switch comprising a thermostatic element and a switch element adapted to be controlled by said thermostat, said thermostat switch being positioned within the cavity and a thermofuse positioned also within the cavity, electric circuit-defining means joining said thermostat switch, said heater and said fuse in circuit, and a control switch in said circuit.

5. In combination in a heater, a structure comprising a mass of metal, said mass of metal being of cylindrical cross section and shaped to define centrally an axially aligned cylindrical cavity, a metallic fluid passage defining a coil, comprising inner and outer portions and positioned outside of the cavity and cast within the mass of material, said coil being provided with entrant and exit ends extending beyond the mass, an electric heater element cast within the mass, positioned between said fluid passage and the cavity and extending at one portion about the cavity and in close proximity to it, a thermostat switch comprising a thermostatic element and a switch element adapted to be controlled by said thermostat, said thermostat switch being positioned within the cavity and a thermofuse positioned also within the cavity, electric circuit-defining means joining said thermostat switch, said heater and said fuse in circuit, and a control switch in said circuit.

6. In combination in a heater, a structure comprising a mass of metal, comprising aluminum, said mass of metal being of cylindrical cross section and shaped to define centrally an axially aligned cylindrical cavity, a metallic fluid passage defining a coil, comprising inner and outer portions and positioned outside of the cavity and cast within the mass of material, said coil being formed of copper and provided with entrant and exit ends extending beyond the mass, a generally U-shaped electric heater element cast within the mass, positioned between said fluid passage and the cavity and extending at one portion about the cavity in close proximity to it, a thermostat switch comprising a thermostatic element and a switch element adapted to be controlled by said thermostat, said thermostat switch being positioned within the cavity and a thermofuse positioned also within the cavity, electric circuit-defining means joining said thermostat switch, said heater and said fuse in circuit, and a control switch in said circuit.

References Cited in the file of this patent

UNITED STATES PATENTS

| | | |
|---|---|---|
| 2,145,287 | Beyrodt | Jan. 31, 1939 |
| 2,247,816 | McIlrath | July 1, 1941 |
| 2,576,558 | Bede | Nov. 27, 1951 |